Sept. 9, 1958 J. O. PAIVINEN 2,851,675

MAGNETIC CORE TRANSFER CIRCUIT

Filed Sept. 20, 1954 2 Sheets-Sheet 1

INVENTOR
JOHN O. PAIVINEN
BY Laurence R. Brown
ATTORNEY

INVENTOR
JOHN O. PAIVINEN
BY Laurence R. Brown
ATTORNEY

United States Patent Office 2,851,675

Patented Sept. 9, 1958

2,851,675

MAGNETIC CORE TRANSFER CIRCUIT

John O. Paivinen, Berwyn, Pa., assignor to Burroughs Corporation, Detroit, Mich., a corporation of Michigan Application September 20, 1954, Serial No. 457,197

3 Claims. (Cl. 340—174)

This invention relates generally to storage mechanisms and more specifically to improvements in magnetic shift registers.

Magnetic shift registers are well known in the prior art. Magnetic cores having a substantially rectangular hysteresis loop material are frequently used as the storage element in magnetic shift registers. Ordinarily this is accomplished by structure comprising a plurality of magnetic cores arranged in a series order and coupled together by coupling means comprising an output winding wound on a given core and an input winding on the next adjacent magnetic core. The remanence condition of the cores represents the information stored therein. Diodes or other asymmetrically conducting means are often included in said coupling means to permit current flow in one direction only. The row of magnetic cores is generally divided into two groups of cores; the first group of cores comprising every odd numbered core in the series arrangement and the second group of cores comprising every even numbered core in the series arrangement. Shift windings are individually wound on each of the magnetic cores, and those shift windings in the first group and in the second group are coupled together in two separate circuits. Energization of the first group of shift windings will cause information stored in each of said first group of magnetic cores to be transferred to the following ones of said second group of magnetic cores. Similarly, information stored in each of the second group of magnetic cores can be transferred to the following ones of said first group of magnetic cores by energization of the second group of shift windings. Energization of the shift windings will cause the magnetic cores to acquire a reference remanence condition. Information is stored in the cores in opposite polarity to the reference condition, and therefore energization of a shift winding will involve a reversal of remanence polarity. In the case of other cores not having information stored therein, no reversal results. If the magnetic flux condition of a particular magnetic core is such that excitation of the associated shift winding does not cause the core to reverse its remanence polarity, there should preferably be no transfer current flow induced in the coupling means coupling that core to the next adjacent core. However, a small transfer current flow which is actually a noise current is often present with sufficiently large amplitude that it is undesirable. This noise transfer current may result from inherent poorness of the properties of the magnetic core material or may be generated spuriously within the circuitry. It would constitute a definite improvement in the art to provide means for minimizing the transfer of such noise signals in the direction of propagation of stored information between two cores.

An important object of the present invention is to provide circuit means adapted to minimize the transfer of noise in the direction of propagation of stored information along magnetic shift registers.

Another important object of the invention is to increase the reliability of magnetic shift registers.

A third object is to provide a shift register requiring shift pulses having a less critical shape than heretofore known.

A further object of the invention is to generally improve magnetic shift registers.

In accordance with an embodiment of the invention there is provided a row of magnetic cores, with an input winding, an advance current pulse winding, and an output winding on each of the magnetic cores. There is further provided a coupling circuit between the output winding of each magnetic core and the input winding of the immediately succeeding magnetic core. Each of these coupling circuits is comprised of a diode or other asymmetrically conducting device and a resistor connected in series arrangement with the associated output and input windings. The resistor is connected in series circuit with the advance winding of the immediately preceding magnetic core in said row. Thus, energizing means provided to apply current to the advance winding of the immediately preceding magnetic core causes a potential to be developed in the resistor at the time information is being transferred from the preceding core. This potential is caused to be sufficient to cancel out noise pulses tending to be transferred in the direction of propagation of information. Across each resistor of a further embodiment there is connected a series combination of an inductor and a diode or other asymmetrically conducting means, and the advancing current is coupled to the junction of the inductor and diode. The diode is poled to present a low impedance to current from an advance pulse source passing through the resistor.

In accordance with one feature of the invention the potential developed across the resistor upon the transmission of current from the advance pulse source, under conditions such that the polarity of the magnetic flux of the particular magnetic core immediately preceding the resistor is not switched thereby, will bias the coupling circuit diode to cutoff and prevent any appreciable noise transfer currents that might be induced from flowing through the coupling circuit containing the resistor in the direction of propagation of information.

The inductor shunting the resistor forms a wave shaping network for current passing through the resistor to more efficiently reduce noise without as much power loss of advancing current in the resistor. The presence of the diode shunting the resistor aids in dissipating energy in the inductor at the end of the advance current pulse.

These and other objects and features will be more fully understood from the following detailed description when read in conjunction with the drawings, in which.

Figures 1, 2:
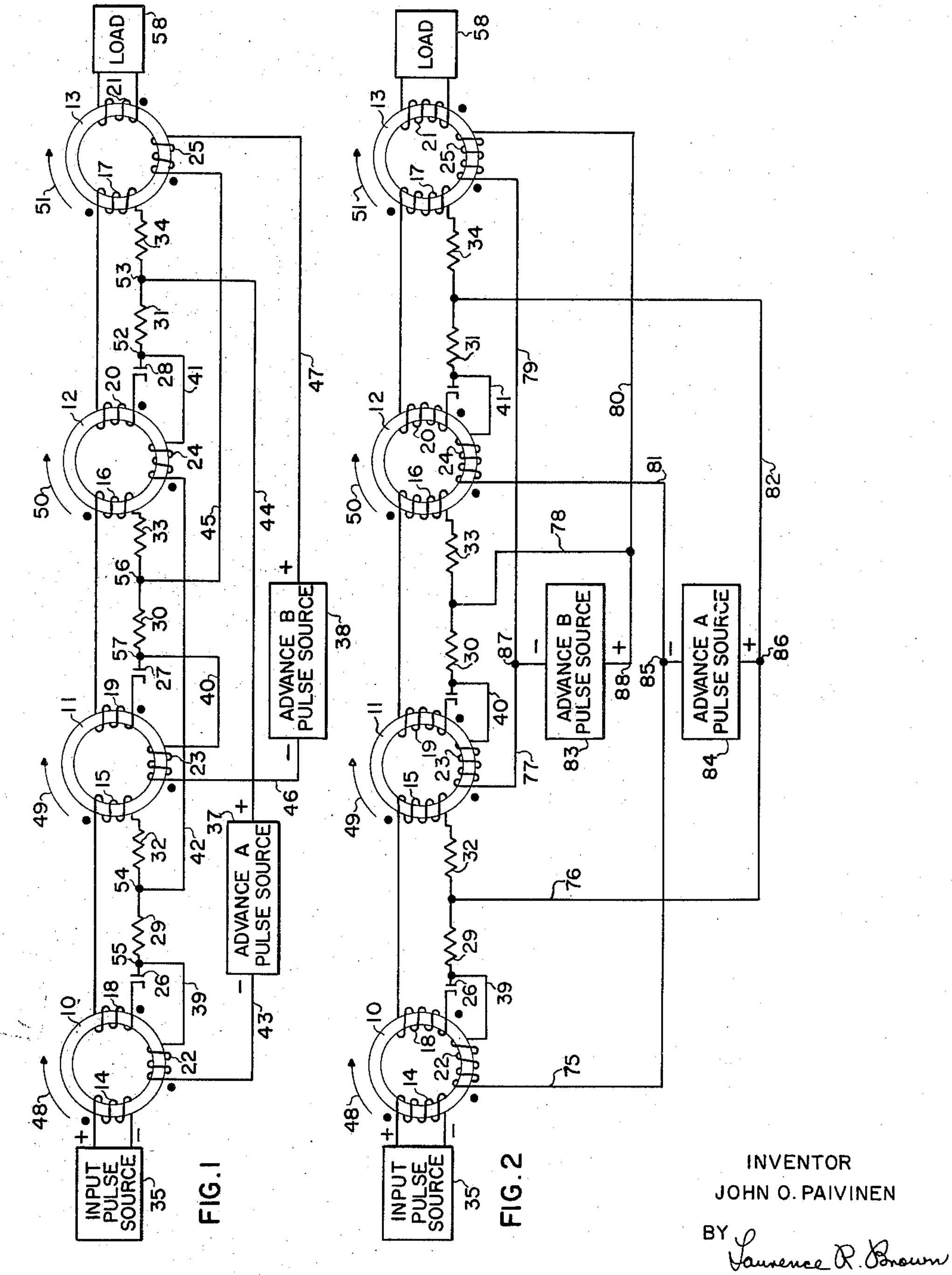
Figs. 1 and 2 are schematic sketches of magnetic shift register circuits embodying the invention.

Referring now to Fig. 1, the magnetic cores 10, 11, 12 and 13 each have wound thereon an input winding 14, 15, 16 and 17 respectively, an output winding 18, 19, 20 and 21 respectively, and an advance winding 22, 23, 24 and 25 respectively. Input pulse source 35 is connected across the terminals of the input winding 14 of core 10 and load or utilization circuit 58 is connected across the terminals of the output windings 21 of core 13. The upper terminal of each of the output windings 18, 19 and 20 of cores 10, 11, and 12 is coupled to the respective upper terminals of the input windings 15, 16 and 17 of corresponding cores 11, 12 and 13. The lower terminal of output winding 18 is connected to the lower terminal of input winding 15 by a series circuit comprising diode 26, resistance 29, and resistance 32. In like manner the lower terminals of output windings 19 and 20 are connected to the lower terminals of input windings 16 and 17. It is to be noted that the asymmetrically conducting devices 26, 27 and 28, and the resistances 29 through 34 can be positioned in any order within the associated coupling circuit as long as they are connected in series arrangement with the associated output and input windings. However, the potential across the resistors 29 and 31 caused by current from the advance A pulse source or the potential across resistor 30 caused by current from the advance B pulse source must be of such a polartity that it will bias the associated diode to cutoff. Since conduction of this diode is necessary to pass stored information along the shift register, any spurious noise in the forward direction is thereby gated out.

The advance A pulse source and the advance B pulse source are each associated with alternate sets of magnetic cores. For example, advance A pulse source 37 is adapted to transfer information from cores 10 and 12 to cores 11 and 13 respectively and the advance B pulse source 38 is adapted to transfer information from cores 11 and 13 to core 12 and load 58 respectively. The advance A pulse source 37 current path may be traced from advance A pulse source 37 through conductor 44, to point 53, through resistance 31, conductor 41, winding 24, conductor 42, point 54, resistance 29, conductor 39, and winding 22 back to the advance A pulse source 37 through conductor 43.

The advance B pulse source 38 current path may be traced from source 38 through conductor 47, winding 25 of core 13, the injunction 56, resistance 30, conductor 40, winding 23 of core 11, and back to advance B pulse source 38 through the conductor 46.

It is to be noted that substantially all of the current flow of both the advance A and the advance B current pulses will pass through the resistances 29, 30, and 31 since the impedances of the diodes 26, 27, and 28 and resistors 32, 33 and 34 are presented to that portion of the advance current which tends to flow in the respective directions through the input and output windings. This will be explained more fully hereinafter in the detailed description of the operation of the device.

In one preferred embodiment of the invention the following circuit constants, materials, and dimensions may be used. Magnetic cores 10, 11, 12 and 13 are composed of a magnetic material having a substantially rectangular hysteresis loop characteristic. One such material is well known in the trade as Deltamax. The mean diameters of the magnetic cores 10, 11, 12 and 13 is about 0.375 inch, the width is about 0.125 inch, and the thickness is about 0.0002 inch. Input windings 14, 15, 16 and 17 are each composed of approximately 40 turns. Output windings 18, 19, 20 and 21 are each composed of about 100 turns, and advance windings 22, 23, 24 and 25 are each composed of approximately 150 turns. The output pulses of advance A pulse source 37 and advance B pulse source 38, in the preferred embodiment shown herein, have an amplitude of about 150 milliamperes and a time duration of about 20 microseconds. Resistances 29 through 34 each have a value of the order of 20 ohms. Although consideration of other types of transfer noise is not necessary to the understanding of the present invention, conventional means as shunt diodes may be coupled in the described embodiment between terminals 55, 57, and 52 respectively and the upper terminals of windings 14, 15 and 20 to prevent the backward flow of noise in the transfer circuits upon switching of cores by the advance pulses. Should it be desired to provide satisfactory operation with a single diode 26, 27 or 28 as shown in the transfer loop, the well known techniques described in detail in chapter 4 of the publication "Pulsed Magnetic Core Devices," by N. R. Kornfield, dated May 25, 1953, published and copyrighted 1953 by the Burroughs Corporation may be employed.

Referring now to Fig. 2 there is shown a similar embodiment of the invention in which the advance windings are connected in parallel arrangement with each other with respect to the associated advance pulse sources. More specifically the output terminals 85 and 86 of the advance A pulse source 84 are connected directly across the series combination of advance winding 22 of core 10 and the resistor 29 through conductors 75 and 76. Similarly the output terminals 85 and 86 of the advance A pulse source 84 are connected directly across the series combination of the advance winding 24 of core 12 and the resistance 31 through the conductors 81 and 82. Similarly the output terminals 87 and 88 of the advance B pulse source 83 are connected directly across the series combination of the advance winding 23 of core 11 and the resistance 30 through the conductors 77 and 78 and also across the advance winding 25 of core 13 through the conductors 79 and 80. The remainder of the circuit is the same as the corresponding portion of the circuit of Fig. 1 and therefore corresponding elements have the same reference characters.

Figure 3:
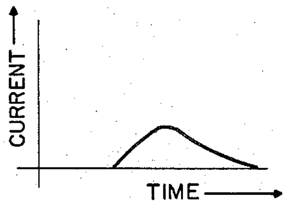
Fig. 3 is a chart showing the waveform of a typical noise transfer current pulse.
Figure 4:
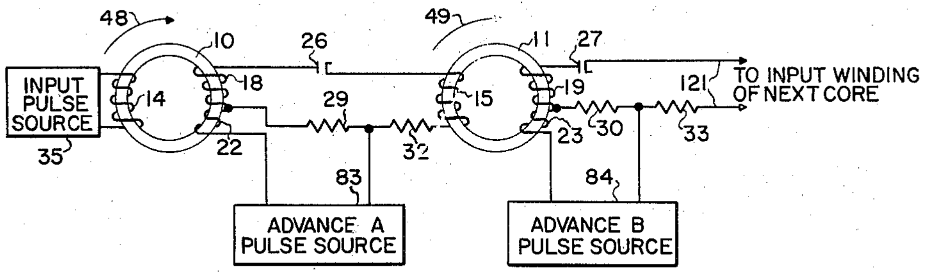
Figs. 4 and 5 are schematic sketches of further magnetic core coupling circuits embodying the invention.
Figure 5:
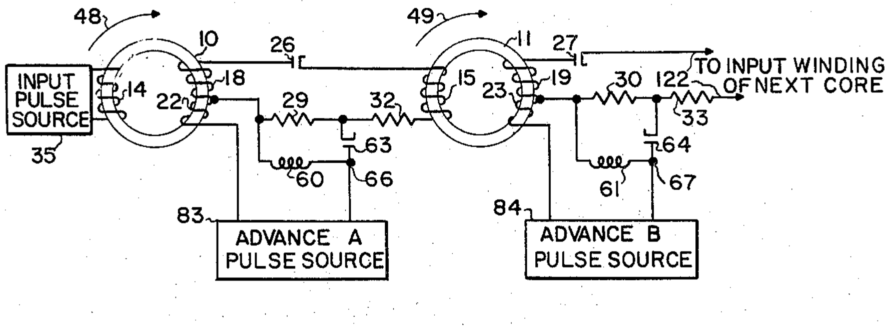

Likewise corresponding portions of the circuitry of Figs. 4 and 5 have the same reference characters. However, in Fig. 5, inductances 60 and 61 and series diodes 63 and 64 have been connected across the respective resistances 29 and 30. Specifically the series combination of inductance 60 and asymmetrically conducting device 63 connected across the resistance 29, etc. A terminal of advance A source 83 of core 10 is connected in this circuit, however, at the junction point 66 on one end of inductor 60. The junction point 67 is likewise connected to a terminal of the advance B source 84 of core 11. The function of the added inductances 60 and 61 is to present an initial high impedance to each of the advance current pulses and subsequently, a relatively low impedance thereto so that the advance current pulses flowing through the corresponding resistances 29 and 30 are substantially exponential in shape and similar to the noise transfer current which has a waveform like that shown in the curve of Fig. 3. The diodes 63 and 64 constitute means for providing a short discharge time-constant for the inductances 60 and 61 at the end of an advance pulse and causes any energy stored in the inductances 60 and 61 to be dissipated in the diodes rather than in a spurious switching of the cores.

Elements of Fig. 4 correspond to elements of Fig. 1 and are given the same reference character as, for example, cores 10 and 11. The principal difference is that the diode locations are changed. The winding portions corresponding to the advance windings of Fig. 1 may be connected optionally in either parallel or series arrangement with their respective advance pulse sources when more than two cores are coupled together.

It is to be noted that the "dot" notation of indicating winding orientation is used in Figs. 1 and 2. A dot at a terminal of a given winding on a core indicates that if current is caused to flow into that particular terminal of the winding then current will flow out of the dotted terminal of any other winding wound on the same core.

Referring to the operation of the circuits of Figs. 1 and 2, assume that the arrows 48, 49, 50 and 51 of magnetic cores 10, 11, 12 and 13 represent the direction of positive magnetic flux and further assume that a condition of positive remanence represents a stored binary bit of "1" and that a condition of negative remanence represents a stored binary bit of "0." If a positive input pulse as indicated by the "plus" sign in Fig. 1 is applied to the winding 14 from input pulse source 35, the magnetic core 10 will acquire a condition of positive remanence. Although a voltage will be generated in winding 18 having its positive terminal at the dotted terminal of winding 18, due to the presence of the diode 26, no appreciable current will flow in the coupling circuit between cores 10 and 11. It will be assumed that magnetic cores 11, 12 and 13 are in a condition of negative remanence at this time and that it is desired to transfer the binary bit of "1" stored in magnetic core 10 to core 12 and to transfer the "0" stored in core 12 to the load 58. This will involve transferring the "1" from core 10 to core 11 and then from core 11 to core 12 and further will involve transferring the "0" stored in core 12 to core 13 and then to the load 58. The advance A pulse source 37 is caused to transmit a pulse which follows the path set forth hereinbefore, and this pulse is followed and preceded by a pulse from the advance B pulse source 37.

The advance B current flow through advance winding 25 will cause the core 13 to change from a condition of negative remanence to a condition of negative saturation which will generate only a small noise signal in the output winding 21 of core 13. The advance A current flow through the winding 24 will cause the magnetic flux in the core 12 to also change from a condition of negative remanence to a condition of negative saturation. This will cause a small positive noise voltage to be generated at the undotted terminal of winding 20. This small positive voltage will tend to cause a small current flow from the undotted terminal of winding 20, through winding 17 of core 13, resistance 34, resistance 31, diode 28, and back to the winding 20. The advance A pulse which generates the noise voltage will, however, create a bias potential drop across the resistance 31 such that the negative polarity is impressed upon the anode of the diode 28 and the positive polarity is impressed upon the cathode of the diode 28 through the resistance 34, the winding 17 of core 13, and the winding 20 of core 12. No appreciable current is thereby caused to flow through the diode 28 since the high back impedance thereof is presented to the potential created across the resistance 31. This bias potential across the diode 28 cuts off current flow through the diode until a positive voltage of greater magnitude than the noise voltage is applied to the anode of the diode 28. By design of circuit parameters, the small positive voltage generated at the undotted terminal of winding 20 of core 12 is of insufficient magnitude to overcome the diode cutoff voltage present across the resistance 31. Thus it can be seen that undesirable noise transfer currents are prevented from flowing in the coupling circuit between core 12 and core 13 in the circuitry of Fig. 1 when a binary bit of "0" is transferred from core 12 to core 13.

Likewise the advance A pulse current flows through the resistance 29 and winding 22. The advance current pulse flowing through the winding 22 will cause the magnetic flux of core 10 to switch from a condition of positive remanence to a condition of negative saturation to cause a large voltage to be induced in the output winding 18 of core 10. This voltage induced in the winding 18 of core 10 is large in comparison to the voltage created across the resistance 29 by the flow of the advance A pulse current flow therethrough. Consequently, the diode 26 is not held at cut-off and the voltage developed across the resistance 29 due to the flow of the advance A pulse therethrough will not serve to prevent the transfer of the voltage induced across the output winding 18 when a "1" is stored therein and read out by the advance A pulse.

The relatively large voltage developed across the winding 18 has its positive polarity at the non-dotted terminal of the winding 18. Thus the current will flow from the non-dotted terminal of output winding 18 through the winding 15 of core 11, resistance 32, resistance 29, diode 26 to the winding 18. This current flow through the winding 15 will cause the core 11 to switch from a condition of negative remanence to a condition of positive remanence, thus effectively transferring a binary bit of "1" from the core 10 to the core 11. It is to be understood that the transferring of the binary bit of "1" from the core 10 to the core 11 and the transferring of the binary bit of "0" from the core 12 to the core 13 is accomplished substantially simultaneously. An application of a later pulse from the advance B pulse source 38 will transfer the binary bit of "1" stored in core 11 to core 12 and will transfer the binary bit of "0" stored in core 13 to the load 58 in a similar manner. Similarly, subsequently applied advance pulses will cause the binary information contained in the cores to be transferred along the register.

The operation of the circuit of Figs. 2 and 4 are the same as the circuit of Fig. 1 except that the advance pulses are applied directly across each series combination of advance winding and associated noise reducing resistance in parallel rather than in series circuit.

In the circuit of Fig. 5, the general operation is similar to that described with respect to Fig. 1. However, it has been observed that the noise transfer current has a waveform somewhat exponential in shape as shown in Fig. 3. Because of this it is advantageous to modify the noise-bucking potential generated across resistors 29 or 30. The presence of the inductances 60 and 61 will cause the opposing voltage or current to have a waveform well suited to inhibit the noise transfer current. At the same time, the inductances serve to reduce the power loss in the advance current caused by the resistances 29 and 30. Thus, when an advance pulse first begins to flow through one of the inductances, the inductance will offer a high impedance thereto and most of the current will initially flow through the parallel resistance. As the counter electromotive force in the inductance dies away, however, most of the current will flow through the inductance without power loss since the advance pulse is substantially a change in direct current level. This, however, provides the cut-off bias for the diodes during the time the noise pulse is being generated and does not reduce the effectiveness of noise reduction.

The presence of the diodes 63 and 64 result in a short discharge time constant for the inductances 60 and 61 respectively at the termination of the advance A pulse and causes any energy stored in the inductances 60 and 61 to be dissipated mostly in the diodes 63 and 64 rather than in a spurious switching of magnetic cores 11 or 12, respectively. As a specific example, if a positive advance pulse from source 83 is caused to flow into the junction 66, then, at the cessation of the pulse the energy stored in inductance 60 tends to flow in parallel paths through resistance 29 and the series combination of diode 26, winding 18, winding 15 and resistance 32 and then through the high back impedance of diode 63 back to inductance 60. Because of the back impedance of diode 63, little current will flow and substantially all the energy is dissipated therein rather than in the coupling circuit.

Having therefore described the invention and its operation, those novel features believed descriptive of its nature and scope are defined with particularity in the appended claims.

What is claimed is:

1. A magnetic circuit comprising a first magnetic core and a second magnetic core, each of said cores being capable of assuming either of two stable states of magnetic remanence, an input winding associated with said first magnetic core, a first output winding associated with said first magnetic core, a first advance current pulse winding associated with said first magnetic core, a second input winding associated with said second magnetic core, a second output winding associated with said second magnetic core, a second advance current pulse winding associated with said second magnetic core, a combination of circuit elements comprising an asymmetrically conducting device, a first resistive means, and a second resistive means connected in series arrangement with said first output winding and said second input winding, a first terminal of said first resistive means being connected to a first terminal of said first advance pulse winding means, a first advance pulse source coupled to apply a pulse across the second terminal of said first resistive means and a second terminal of said first advance pulse winding, and a second advance pulse source coupled to energize said second advance pulse winding after the pulse from the first advance pulse source occurs, said asymmetrically conducting device being connected in such polarity that it presents a low impedance to pulses induced in said first output winding by pulses from said first advance pulse source, the current from the first advance pulse source flowing through the first resistive means being proportioned to bias the asymmetrically conducting device such that stored information is transferred from the first core to the second core in response to the advance pulses from the first source and noise pulses tending to be transferred from the first core to the second core in response to the advance pulses from the first source are inhibited, a series inductance and a further asymmetrically conducting device connected in parallel with said first resistance, said further asymmetrically conducting device being connected between the second terminal of said first resistive means and the first advance pulse source.

2. A magnetic circuit comprising in combination, two magnetic storage devices, a coupling circuit connecting the two devices, each capable of assuming either of two stable states of magnetic remanence, an advancing current source, means for passing information in one direction through the coupling circuit in response to advancing current from said source, and impedance means in said coupling circuit coupled to pass current from said source in the direction tending to inhibit transfer of information in said one direction, said impedance means comprising a resistor together with a series inductor and diode connected in parallel therewith.

3. In combination; first and second magnetic cores each capable of assuming either of two stable states of magnetic remanence, one of which is a reference state; an output winding on said first core; an input winding on said second core; interconnecting means coupling said output and input windings and in combination therewith forming a loop, said interconnecting means including a first asymmetrically conducting device so poled as to tend to be forward biased both by the relatively large voltage induced in said output winding when said first core switches from its other state of remanence to its reference state or by the relatively small noise voltage induced in said output winding when said first core switches from its reference state of remanence to saturation of reference polarity; a switching winding on said first core; and means for driving a pulse of switching current through said switching winding, said means including a parallel network comprising an inductor and in shunt therewith a second asymmetrically conducting device and a resistor series connected, said resistor being also included in said interconnecting loop, said inductor offering sufficiently high impedance to the leading edge of said switching current pulse to develop across said resistor a voltage of a polarity and magnitude sufficient to reverse bias said first asymmetrically conducting device, thereby to override the noise voltage induced in said output winding when said first core changes from its reference state of remanence to saturation of reference polarity, said inductor offering relatively low impedance to the flat portion of said switching current pulse, thereby to develop insufficient voltage across said resistor to override the larger voltage induced in said output winding when said first core changes from its other state of remanence to its reference state of remanence.

References Cited in the file of this patent

UNITED STATES PATENTS

| | | |
|---|---|---|
| 2,683,819 | Rey | July 13, 1954 |
| 2,685,644 | Toulon | Aug. 3, 1954 |
| 2,695,993 | Haynes | Nov. 30, 1954 |
| 2,708,722 | An Wang | May 17, 1955 |
| 2,768,312 | Goodale et al. | Oct. 23, 1956 |

OTHER REFERENCES

Publication I, Paper #150 of IRE Meeting of Mar. 5, 1952 (pp. 6–7 and an additional sheet containg Fig. 8). (Copy in Div. 42.)

Publication II, Journal of App. Physics, January 1950, pp. 49–54.